Nov. 9, 1965   N. HOGLUND   3,216,324
APPARATUS FOR FORMING CONTOURS
Filed June 26, 1963   4 Sheets-Sheet 1
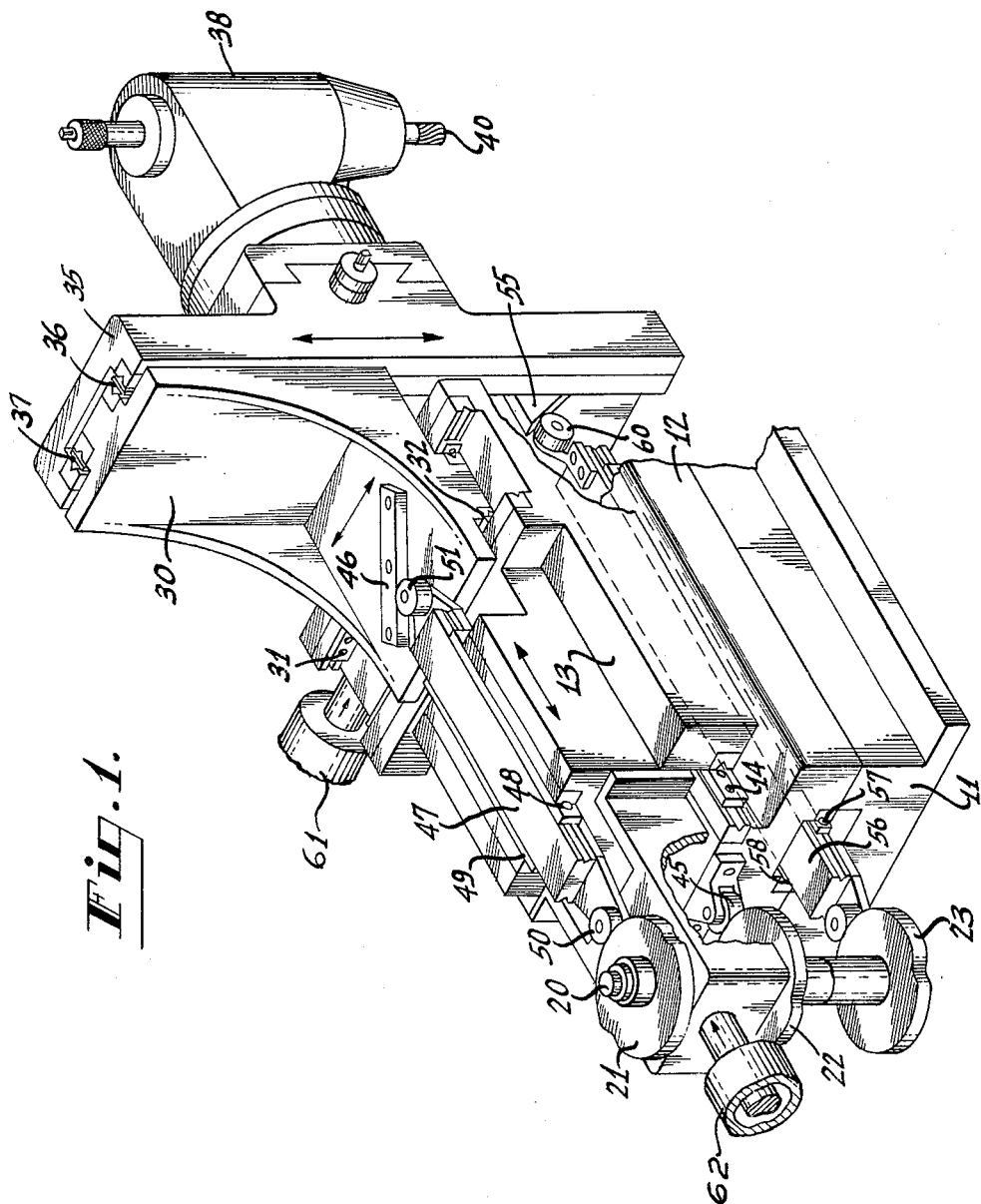
INVENTOR.
NILS HOGLUND
BY
William A. Zalesak
Attorney Nov. 9, 1965 N. HOGLUND 3,216,324
APPARATUS FOR FORMING CONTOURS
Filed June 26, 1963 4 Sheets-Sheet 2
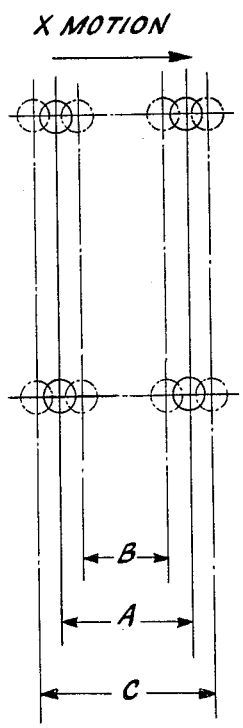
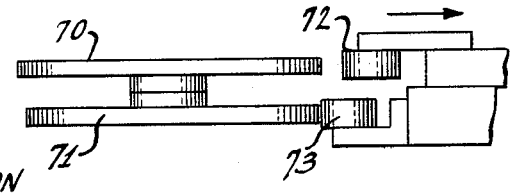
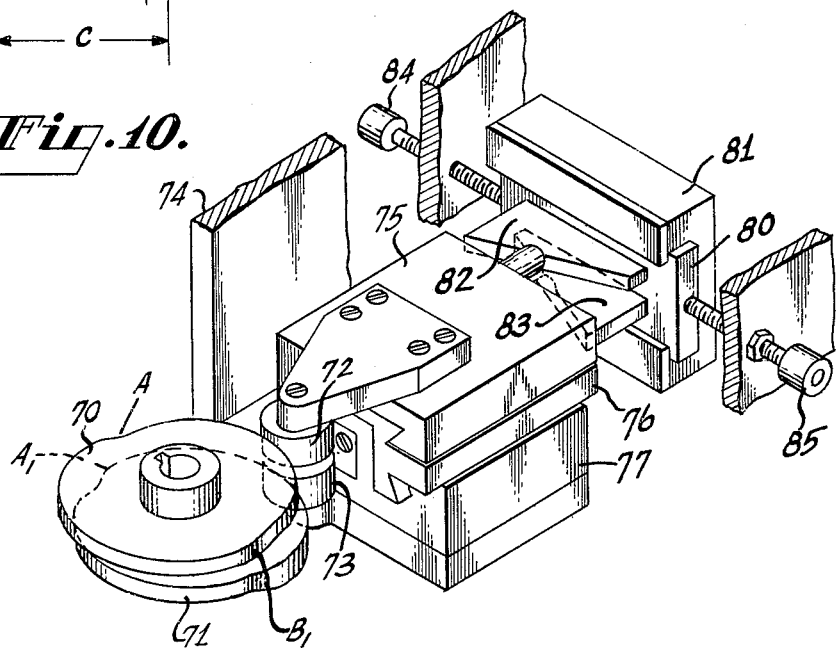
INVENTOR.
NILS HOGLUND Nov. 9, 1965  N. HOGLUND  3,216,324
APPARATUS FOR FORMING CONTOURS
Filed June 26, 1963  4 Sheets-Sheet 3
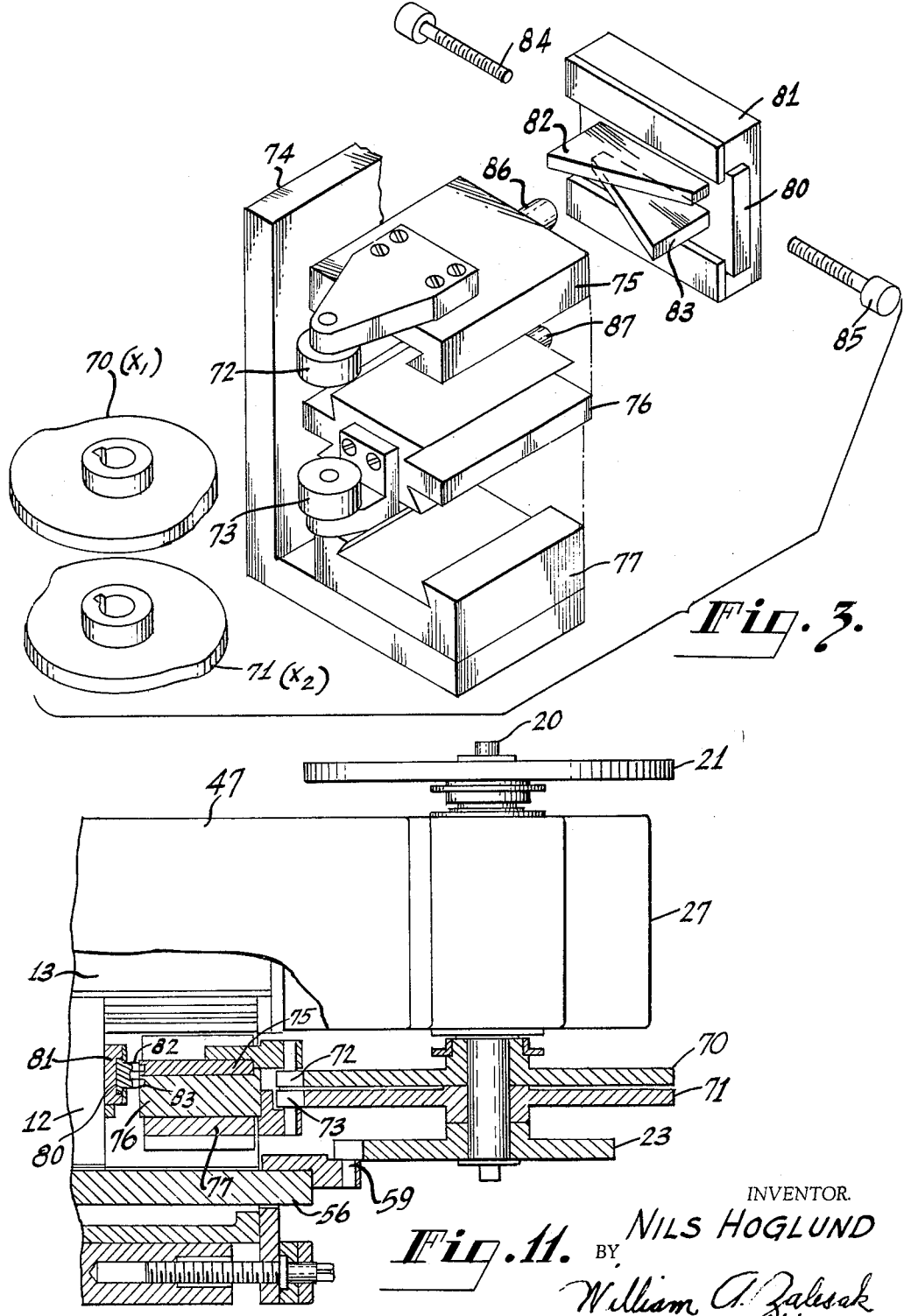
INVENTOR.
NILS HOGLUND
BY William A. Zalesak
Attorney

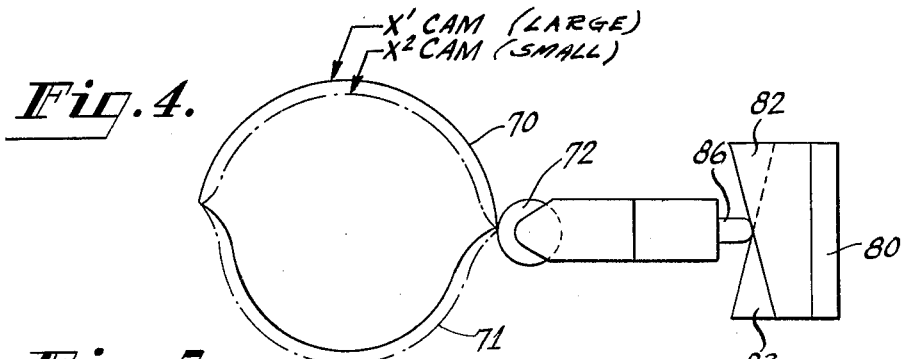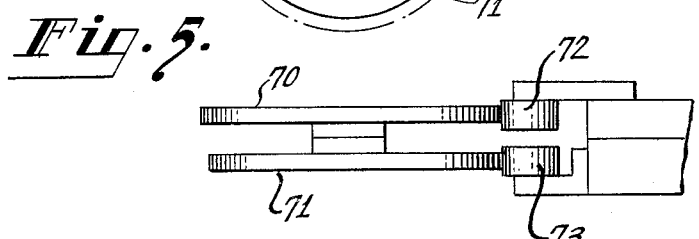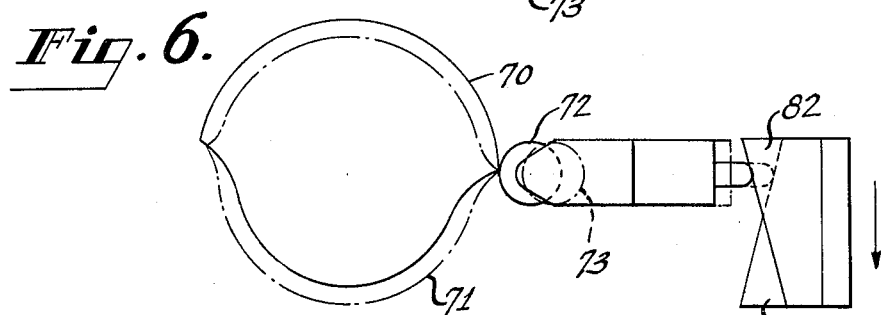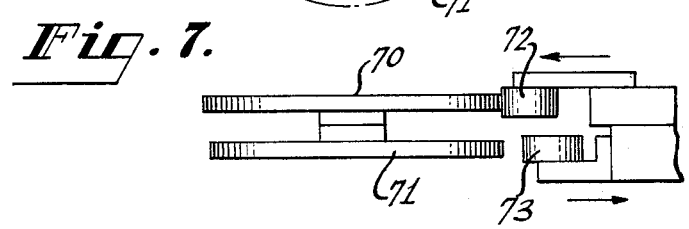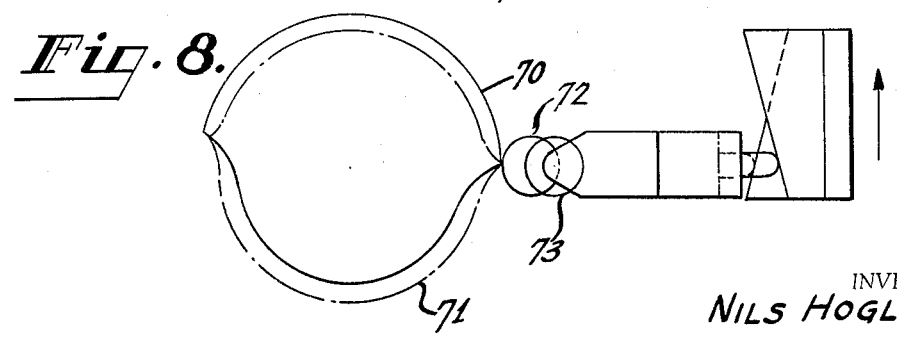

United States Patent Office 3,216,324
Patented Nov. 9, 1965

3,216,324
APPARATUS FOR FORMING CONTOURS
Nils Hoglund, 296 Hartshorn Drive, Short Hills, N.J.
Filed June 26, 1963, Ser. No. 290,766
8 Claims. (Cl. 90—13.5)

My invention relates to apparatus for forming contours in a plurality of dimensions on a work piece and particularly to improvements for controlling the cutting path of a milling tool, for example.

One form of apparatus utilizing my invention includes a base upon which is slidably mounted a housing which moves toward and from a work piece. A first slide is mounted at one end of the housing for movement transversely of the movement of the housing. A second or tool slide is mounted on the first slide and is movable transversely of the movement of the housing and first slide. To obtain movement of the housing and tool slide, a plurality of cams specifically three, are rotatably mounted on the housing at the end opposite the first and second slides. Followers mounted on other slides and the base cause movement of the housing and the first and tool slides, the cams and followers all being biased against each other.

A third slide mounted on the housing has a follower at each end, one engaging one of the rotatable cams and the other engaging a cam on the first slide. A fourth slide mounted on the base has a follower at each end, one engaging a second of the rotatable cams and the other a cam on the tool slide. A third follower is mounted on the base and is in contact with the third cam and controls movement of the housing.

In this form of apparatus to generate very accurately a certain width of the cutting path controlled by the cams, it is necessary to have exact size cutters, and cams which are not worn since adjustment for cam wear is not provided. If the cutters must be resharpened, the result is that the cutters become of smaller diameter. Thus, it is necessary to have cams of exact size as well as cutters of exact diameter to produce the desired accurate contours.

It is therefore an object of my invention to provide an apparatus utilizing a cutting tool capable of providing contours in a plurality of directions and capable of being adjusted to compensate for tool wear and cam wear resulting from use of such apparatus.

More specifically, it is an object of my invention to provide for adjustment of the width of the cutting path of the tool as the tool and the controlling cams wear.

In the drawings:

FIG. 1 is a schematic perspective of one form of apparatus in which my invention may be utilized;

FIG. 2 is a perspective view of the mechanism made according to my invention for controlling the width of the path of the cutting tool;

FIG. 3 is an exploded view of the mechanism shown in FIG. 2;

FIGS. 4–9 inclusive are schematic diagrams of the cams and followers showing the various relationships for determining the different cutting tool path widths;

FIG. 10 is a diagram showing the difference in width of the cutting tool path with respect to the relationships shown in FIGS. 4 to 9 inclusive; and FIG. 11 shows part of an actual apparatus in vertical section and in which any invention has been used.

Referring now to FIGS. 1 and 11, apparatus utilizing my invention includes a base housing 11 and a subhousing 12. A slide or slide housing 13 is slidably supported in the subhousing 12 by means of ball bearing assemblies 14 (one on each side). Mounted at one end of the slide housing 13 is a rotatable shaft 20 upon which are supported and fixed the circular cams 21, 22 and 23. A motor (not shown) is connected to the shaft 20 by means of a gear train within the gear box or housing 27. Since the cams are all fixed to the same shaft, no error in the motion of the shaft will be caused by back lash or looseness between the three cams. The angular displacement of the cams will therefore be identical relative to the corresponding followers contacting the individual cams.

Mounted at the other end of the slide housing 13 is the slide mechanism 30 mounted on the bearing assemblies 31 and 32. This slide mechanism moves transversely of the movement of the slide housing 13. The tool slide 35 carrying the tool chuck 38 and tool 40 is slidably supported on slide mechanism 30 by ball bearing assemblies 36 and 37 for movement transversely of slide 30 or vertically. The tool chuck 38 is driven by a motor not shown.

To provide movement of the various slides heretofore mentioned to cause the milling tool 40 to follow the desired path, slides, cams and cam followers to be described are provided.

The subhousing 12 has rotatably fixed thereto a cam follower 45 which contacts cam 22 on spindle 20. As cam 22 rotates housing 13 will move as indicated by the double headed arrow shown thereon, that is, this provides the X motion for the tool.

The slide mechanism 30 is provided with a cam 46 secured thereto. The slide housing 13 slidably supports a slide 47 thereon by means of the ball bearing assemblies 48 and 49. Mounted at the ends of slide 47 are the roller cam followers 50 and 51 which contact the circular cam 21 and the cam 46. As cam 21 rotates it causes slide 47 to move toward slide 30 causing slide 30 to move as indicated by the double headed arrow shown thereon, that is horizontally and transversely of the slide housing 13. This movement gives the tool 40 its Y movement.

To give the tool 40 its vertical or Z motion, I provide the tool slide mechanism 35 provided with a ratio cam 55. A slide 56 is slidably mounted in the subhousing 12 in ball bearing assemblies 57 and 58. Roller cam followers 59 and 60 are mounted at the ends of the slide 56 contacting circular cam 23 and ratio cam 55. As slide 56 moves toward and from the tool slide 35, it causes vertical up-and-down movement of tool 40.

The hydraulically operated pistons 61 and 62 apply the necessary biasing forces as indicated to keep the various cams and followers in contact.

The apparatus above described is one form of apparatus for which my invention is suited.

In accordance with my invention, for the cam and follower arrangements 22 and 45, I substitute the double cam and follower arrangement shown in FIGS. 2 and 3. The cams are so made that one-half of one cam is relieved where the other half of the cam is made to do the work.

Cams 70 and 71 ($X_1$) and ($X_2$) are mounted on shaft 20. These cams replace cam 22. Followers 72 and 73 replace follower 45. These followers are supported in frame 74. Follower 72 is supported on slide 75, and follower 73 and slide 76 both supported on slide guide 77.

To adjust the position of the followers 72 and 73, I provide a follower adjustment cam block 80 slidable in slide guide 81. Fixed to block 80 are two triangular-shaped wedges or cams 82 and 83, oppositely disposed which contact the pin like followers 86 and 87. Adjustment of the block by means of screws 84 and 85 varies the position of the followers 72 and 73 toward or from the cams 70 and 71 so that the cams and followers have the positions shown in FIGS. 4 to 9 inclusive or in between positions, if desired. It will be convenient in phrasing some of the appended claims to construe the elements 72, 75 and 86 jointly as constituting one follower, and the elements 73, 76 and 87 jointly as constituting another follower.

In FIGS. 4 and 5, the followers are in line and the X motion is shown to be A in FIG. 10. In FIGS. 6 and 7, the lower follower is adjusted away from the cam and the upper follower is adjusted into the cam. The X motion is that shown by C in FIG. 10. In FIGS. 8 and 9, upper follower is adjusted away from its cam and the lower follower adjusted toward the cam. Movement B as shown in FIG. 10 results.

The cams are made so that one half of the cam is relieved where the other half of the cam is made to work. As shown in FIG. 2 points A and $A_1$ and B and $B_1$ are the points where the followers change contact from the upper cam to the lower cam. As the follower adjustment cam block 80 moves to the right as shown in FIG. 2, the upper cam follower moves toward the rotating cams and the lower follower moves away. When the cam block 80 moves to the left, the reverse action takes place. Thus, each cam is active for only part of a revolution, that is for substantially 180 degrees. No contact is made between the cam and its respective follower on the relieved portion (cutaway surfaces) of the cam. In setting up the equipment, the wedges are set in the mean position. Adjustment of the wedge block is then made as desired. In effect, the two cams can be considered complementary.

What is claimed is:

1. Apparatus for forming contours including a support member, a slide on said support member carrying a plurality of rotatable cams thereon, a tool assembly on said slide, a follower assembly on said support member, and means for biasing said slide in a direction to maintain contact between said rotatable cams and said follower assembly, said follower including a pair of slidable followers and means for adjusting said followers toward and from said rotatable cams and relative to each other, said cams being adjacent to each other and having follower contacting surfaces and cutaway surfaces, the cutaway surface of one cam being proximately disposed to and substantially coextensive with the follower contacting surface of the other cam, said followers being in contact with their respective cams at different times during the rotation of said cams.

2. Apparatus for forming contours including a support member, a slide on said support member carrying a plurality of rotatable cams thereon, a tool assembly on said slide, a follower assembly on said support member, and means for biasing said slide in a direction to maintain contact between said rotatable cams and said follower assembly, said follower assembly including a pair of slidable followers, means for adjusting said followers toward and from said rotatable cams and relative to each other, said cams being adjacent to each other and having follower contacting surfaces and cutaway surfaces, the cutaway surface of one cam being proximately disposed to and substantially coextensive with the follower contacting surface of the other cam, said followers being in contact with their respective cams at different times during the rotation of said cams; said means for adjusting said followers including a slidable member, a pair of wedge-shaped members on said slidable member and lying parallel to each other in spaced relationship and oppositely disposed, and means for adjusting said slidable member; said followers being in contact with said wedge-shaped members respectively whereby upon movement of said wedge-shaped members in one direction one of said followers is moved toward said cams and the other moves away from said cams, said adjustment providing variations in the degree of movement of the tool assembly.

3. Apparatus for forming contours in a plurality of directions including a support member, a slide on said support member carrying a plurality of rotatable cams thereon, a tool assembly on said slide, a follower assembly on said support member, and means for biasing said slide in a direction to maintain contact between said rotatable cams and said follower assembly, said follower assembly including a pair of slidable followers and means for adjusting said followers toward and from said rotatable cams and relative to each other, said cams being adjacent to each other and having follower contacting surfaces and cutaway surfaces, the cutaway surfaces of one cam being proximately disposed to and substantially coextensive with the follower contacting surface of the other cam, said followers being in contact with their respective cams at different times during the rotation of said cams; said means for adjusting said followers including a slidable member, a pair of triangular-shaped members on said slidable member and lying parallel to each other in spaced relationship and oppositely disposed, and means for adjusting said slidable member; said followers being in contact with said triangular-shaped members respectively.

4. Apparatus for forming contours including a support member, a slidable housing on said support member carrying a plurality of rotatable cams thereon, a tool assembly on said slide, a follower assembly on said support member, and means for biasing said slidable housing in a direction to maintain contact between said rotatable cams and said follower assembly, said follower assembly including a pair of slidable followers movable parallel to each other, means for adjusting said followers toward and from said rotatable cams and relative to each other, said cams being adjacent to each other and having follower contacting surfaces and cutaway surfaces, the cutaway surfaces of one cam being proximately disposed to and substantially coextensive with the follower contacting surface of the other cam, said followers being in contact with their respective cams at different times during the rotation of said cams.

5. Apparatus for forming contours including a support member, a slidable housing on said support member carrying a plurality of rotatable cams thereon at one end thereof on a common drive shaft, a tool assembly on said slide, a follower assembly on said support member, and means for biasing said slidable housing in a direction to maintain contact between said rotatable cams and said follower assembly, said follower assembly including a pair of slidable followers ad means for adjusting said followers toward and from said rotatable cams and relative to each other, said cams being adjacent to each other and having follower contacting surfaces and cutaway surfaces, the cutaway surface of one cam being proximately disposed to and substantially coextensive with the follower contacting surface of the other cam, said followers being in contact with their respective cams at different times during the rotation of said cams.

6. Apparatus for forming contours including a support member, a slidable housing on said support member carrying a plurality of rotatable cams thereon mounted on a common drive shaft, a tool assembly on said slide, a follower assembly on said support member, and means for biasing said slidable housing in a direction to maintain contact between said rotatable cams and said follower assembly, said follower assembly including a pair of slidable followers movable parallel to each other and means for adjusting said followers toward and from said rotatable cams and relative to each other, said cams being adjacent to each other and having follower contacting surfaces and cutaway surfaces, the cutaway surface of one cam being proximately disposed to and substantially coextensive with the follower contacting surface of the other cam, said followers being in contact with their respective cams at different times during the rotation of said cams; said means for adjusting said followers including a slidable member movable transversely of the movement of said followers, a pair of wedge-shaped members on said slidable member and lying parallel to each other in spaced relationship and oppositely disposed, and means for adjusting said slidable member; said followers being in contact with said wedge-shaped members respectively whereby upon movement of said wedge-shaped members in one direction one of said followers is moved toward said cams and the other moves away from said cams, said adjustment providing variations in the degree of movement of the tool assembly.

7. Apparatus for forming contours including a support member, a slide on said support member carrying a plurality of rotatable cams thereon a common shaft, a tool assembly on said slide, a follower assembly on said support member, and means for biasing said slide in a direction to maintain contact between said rotatable cams and said follower assembly, said follower assembly including a pair of adjacent slidable followers movable parallel to each other and means for adjusting said followers toward and from said rotatable cams and relative to each other, said means including wedge-shaped elements contacting said followers, said cams being adjacent to each other and having follower contacting surfaces and cutaway surfaces, the cutaway surface of one cam being proximately disposed to and substantially coextensive with the follower contacting surface of the other cam, said followers being alternately in contact with their respective cams during the rotation of said cams.

8. Apparatus for forming contours including a support member, a slidable housing on said support member carrying a plurality of rotatable cams thereon on a common shaft, a tool assembly on said slide, a follower assembly on said support member, and means for biasing said slidable housing in a direction to maintain contact between said rotatable cams and said follower assembly, said follower assembly including a pair of slidable followers movable parallel to each other, means for adjusting said followers toward and from said rotatable cams and relative to each other, said cams being adjacent to each other and having follower contacting surfaces and cutaway surfaces, the cutaway surface of one cam being proximately disposed to and substantially coextensive with the follower contacting surface of the other, said followers being alternately in contact with their respective cams during the rotation of said cams; said means for adjusting said followers including a slidable member, a pair of wedge-shaped members on said slidable member and lying parallel to each other in spaced relationship and oppositely disposed, and means for adjusting said slidable member; said followers being in contact with said wedge-shaped members respectively whereby upon movement of said wedge-shaped members in one direction one of said followers is moved toward said cams and the other moves away from said cams, said adjustment provdiing variations in the degree of movement of the tool assembly.

References Cited by the Examiner
UNITED STATES PATENTS

| | | | |
|---|---|---|---|
| 2,660,931 | 12/53 | De Vlieg | 90—13.9 |
| 2,784,647 | 3/57 | Swanson et al. | 90—13 |
| 2,958,262 | 11/60 | Hoglund | 90—13 |

WILLIAM W. DYER, JR., *Primary Examiner.*

LEON PEAR, *Examiner.*